US011028491B2

(12) United States Patent
Hoffmann et al.

(10) Patent No.: US 11,028,491 B2
(45) Date of Patent: Jun. 8, 2021

(54) ELECTROLYSIS ELECTRODE FEATURING METAL-DOPED NANOTUBE ARRAY AND METHODS OF MANUFACTURE AND USING SAME

(71) Applicant: California Institute of Technology, Pasadena, CA (US)

(72) Inventors: Michael R. Hoffmann, South Pasadena, CA (US); Yang Yang, Alhambra, CA (US)

(73) Assignee: California Institute of Technology, Pasadena, CA (US)

( * ) Notice: Subject to any disclaimer, the term of this patent is extended or adjusted under 35 U.S.C. 154(b) by 257 days.

(21) Appl. No.: 16/102,576

(22) Filed: Aug. 13, 2018

(65) Prior Publication Data

US 2019/0048481 A1 Feb. 14, 2019

Related U.S. Application Data

(60) Provisional application No. 62/545,024, filed on Aug. 14, 2017.

(51) Int. Cl.
*C25B 11/12* (2006.01)
*C25B 11/043* (2021.01)
(Continued)

(52) U.S. Cl.
CPC .......... *C25B 11/043* (2021.01); *C01B 32/174* (2017.08); *C01G 23/047* (2013.01); *C25B 11/069* (2021.01); *C01B 2202/08* (2013.01); *C01B 2202/22* (2013.01); *C01P 2002/52* (2013.01); *C01P 2002/54* (2013.01); *C01P 2004/03* (2013.01); *C01P 2004/13* (2013.01); *C01P 2006/10* (2013.01)

(58) Field of Classification Search
CPC ... C25B 11/12; C25B 11/0426; C01B 32/174; C01B 2202/08; C01B 2202/22; C01G 23/047; C01P 2002/52; C01P 2002/54; C01P 2004/03; C01P 2004/13; C01P 2006/10; B01J 27/24; B01J 35/0013; B01J 35/004; B01J 35/065; B01J 37/348; C25D 11/26; C25D 5/50
See application file for complete search history.

(56) References Cited

PUBLICATIONS

Das et al., "Nb doped TiO2 nanotubes for enhanced photoelectrochemical water-splitting", Nanoscale, vol. 3, Jul. 14, 2011, pp. 3094-3096.

(Continued)

*Primary Examiner* — Xiuyu Tai
(74) *Attorney, Agent, or Firm* — Gavrilovich, Dodd & Lindsey LLP

(57) ABSTRACT

An electrolysis electrode includes a metal-doped array of nanotubes formed on a substrate. The nanotube array (NTA) may be a stabilized metal-doped black $TiO_2$ NTA formed on a titanium substrate, and the metal dopant may include any suitable metal, for example, cobalt. The metal dopant improves the reactivity of the electrode and enhances its service life. The metal-doped NTA electrode may provide improved chlorine evolution and/or oxygen evolution activity for electrochemical wastewater treatment. The electrode may also be useful for water splitting applications. Increasing the loading of the metal dopant may lead to the formation of a metal oxide layer on top of the NTA, which improves oxygen evolution reaction (OER) overpotential.

11 Claims, 7 Drawing Sheets

(51) Int. Cl.
*C01B 32/174* (2017.01)
*C01G 23/047* (2006.01)
*C25B 11/069* (2021.01)

(56) References Cited

PUBLICATIONS

Liu et al., "Black Ni-doped TiO2 photoanodes for high efficiency photoelectrochemical water-splitting", International Journal of Hydrogen Energy, vol. 40, Jan. 9, 2015, pp. 2107-2114.
Mohajernia et al., "Photoelectrochemical H2 Generation from Suboxide TiO2 Nanotubes: Visible-Light Absorption versus Conductivity", Chemistry—A European Journal, vol. 23, Jul. 19, 2017, pp. 12406-12411.
Nah, "Doped TiO2 and TiO2 Nanotubes: Synthesis and Applications", ChemPhysChem, vol. 11, Jul. 20, 2010, pp. 2698-2713.
Pozio, "Effect of Low Cobalt Loading on TiO2 Nanotube Arrays for Water-Splitting", International Journal of Electrochemistry, vol. 2014, Article No. 904128, Nov. 9, 2014, pp. 1-7.
Yang et al., "Synthesis and Stabilization of Blue-Black TiO2 Nanotube Arrays for Electrochemical Oxidant Generation and Wastewater Treatment", Environmental Science & Technology, vol. 50, Sep. 20, 2016, pp. 11888-11894.
Young, Lee W., International Search Report and Written Opinion, PCT/US18/46563, United States Patent and Trademark Office, dated Oct. 30, 2018.
Baharlou, Simin, International Preliminary Report on Patentability and Written Opinion, PCT/US18/46563, The International Bureau of WIPO, dated Feb. 27, 2020.

US 11,028,491 B2

ELECTROLYSIS ELECTRODE FEATURING METAL-DOPED NANOTUBE ARRAY AND METHODS OF MANUFACTURE AND USING SAME

CROSS REFERENCE TO RELATED APPLICATIONS

This Application claims the benefit of U.S. Provisional Patent Application Ser. No. 62/545,024, filed on Aug. 14, 2017, the disclosures of which are incorporated by reference herein in the entirety.

TECHNICAL FIELD

The present disclosure generally relates to electrolysis, and more particularly, to electrodes suitable for water treatment and/or water splitting electrolysis.

BACKGROUND

Systems are being proposed for the electrochemical oxidation of pollutants in an electrolyte. Examples of these systems include wastewater treatment systems that employ electrolysis to clean wastewater. Electrolysis may also be used in other applications, for example, splitting water to produce oxygen and hydrogen gas. These electrolysis systems operate by applying a voltage potential between an anode and a cathode that are each in contact with a water medium. In the case of wastewater treatment, the anode and cathode contact wastewater to achieve electrochemical oxidation of organic matter.

The electrodes (anodes and cathodes) in these systems sometimes have one or more semiconductor materials that contact the aqueous medium. The semiconductor electrodes are often composed of expensive rare earth materials. Moreover, the semiconductor materials often degrade relatively quickly during operation of the systems, reducing the service life of the electrodes.

Further, the ability of some of the electrodes to purify water depends on the ability of the anode to generate Reactive Chlorine Species (RCS) and/or hydroxyl radicals in the water. However, some known electrodes generate reactive species at current efficiencies that are too low to be desirable for some wastewater treatment applications.

Accordingly, electrolysis electrodes are desirable that have improved reactive species generation, service life and current efficiency, as well as reduced cost.

SUMMARY

An electrolysis electrode includes a metal-doped array of nanotubes on a substrate. In accordance with an example embodiment, the nanotube array (NTA) may be a stabilized metal-doped black $TiO_2$ NTA formed on a titanium substrate, and the metal dopant may include any suitable metal, for example, cobalt. The metal dopant improves the reactivity of the electrode and significantly extends its service life. The metal-doped NTA electrode may provide improved chlorine evolution and/or oxygen evolution activity for electrochemical wastewater treatment. The electrode may also be useful for water splitting applications.

The metal-doped NTA electrode may be manufactured by anodizing a substrate to form an amorphous NTA on the substrate. The amorphous NTA and substrate structure is then subjected to a second anodization. A metal-dopant solution is applied to the anodized amorphous NTA, whereby producing a metal-doped amorphous NTA. The metal-doped amorphous NTA is then annealed in a gas stream, resulting in the metal-doped NTA electrode.

The metal-doped NTA electrode can be used as an electrocatalyst in water splitting systems for energy production, or alternatively, in electrochemical oxidation (EO) systems that purify water having organic pollutants and/or ammonia by placing it in direct physical contact with the wastewater and applying a suitable voltage potential.

The disclosure also describes a water processing system including one or more electrodes where at least one of the electrodes includes a metal-doped array of nanotubes formed on a substrate.

The foregoing summary does not define the limits of the appended claims. Other aspects, embodiments, features, and advantages will be or will become apparent to one with skill in the art upon examination of the following figures and detailed description. It is intended that all such additional features, embodiments, aspects, and advantages be included within this description and be protected by the accompanying claims.

BRIEF DESCRIPTION OF THE FIGURES

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Figure 1:
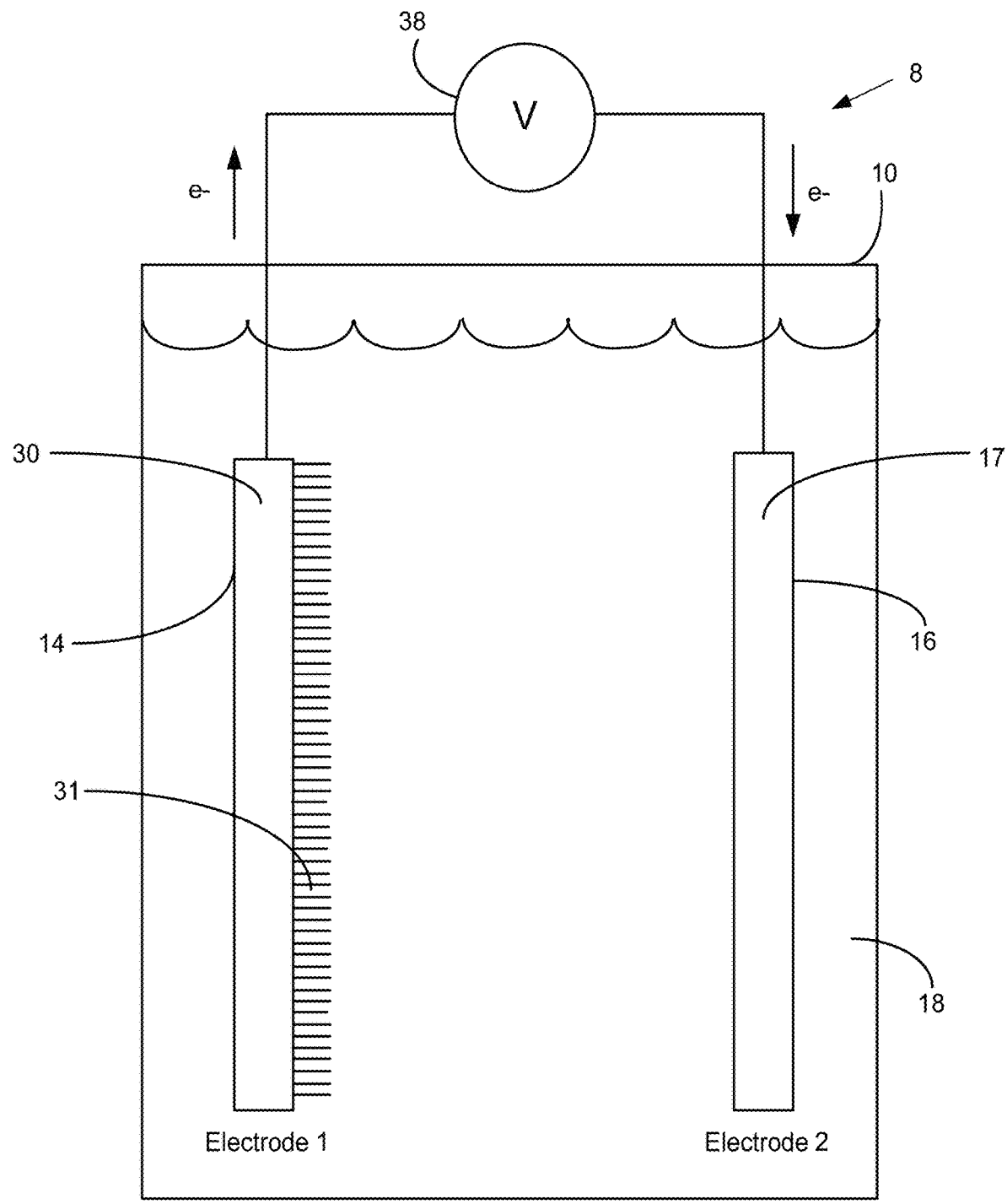
FIG. 1 is a cross-sectional side-view schematic illustration of a first exemplary electrolysis system employing a disclosed electrode.

The following detailed description, which references to and incorporates the drawings, describes and illustrates one or more examples of electrolysis electrodes, water processing systems, and methods of using electrolysis electrodes and water processing systems, and of manufacturing electrolysis electrodes. These examples, offered not to limit but only to exemplify and teach embodiments of inventive electrodes, methods, and systems, are shown and described in sufficient detail to enable those skilled in the art to practice what is claimed. Thus, where appropriate to avoid obscuring the invention, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Although any methods and materials similar or equivalent to those described herein can be used in the practice or testing of the invention(s), specific examples of appropriate materials and methods are described herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Disclosed herein are one or more embodiments of an electrolysis electrode that may be useful for treating polluted water and/or water splitting applications that produce hydrogen and oxygen gas (e.g., solar hydrogen energy production).

Concerning water treatment applications, water scarcity has been recognized as an emerging global crisis. In order to facilitate water recycling and reuse, decentralized wastewater treatment has been proposed as a supplement to the conventional urban wastewater system. In decentralized systems, electrochemical oxidation (EO) can be more efficient than biological treatment and less expensive than homogeneous advanced oxidation processes. In addition, the compact design, ease of automation for remote controlled operation, and small carbon footprint make EO an ideal candidate for small scale, decentralized wastewater treatment and reuse.

The performance of EO in wastewater applications is often determined by the electrochemical generation of reactive species, which largely depends on the nature of anode materials. A number of anode materials have been previously considered. For example, non-active anodes with high overpotentials for oxygen evolution reaction (OER), such as those based on $SnO_2$, $PbO_2$, and boron-doped diamond (BDD), have been investigated in the previous decades. In spite of their superior current efficiency for hydroxyl radical (.OH) generation, $SnO_2$ and $PbO_2$ anodes have poor conductivity and stability. The application of BDD anodes is hindered by their high cost and complicated fabrication. Conversely, Pt-group metal oxides (e.g., $RuO_2$ and $IrO_2$) are efficient and stable catalysts for OER, exhibiting high chlorine evolution reaction (CER) activity in the presence of chloride, although they are typically less efficient for hydroxyl radical generation. Hence, the development of durable anodes with high activity for CER, OER, and radical generation is an ongoing challenge.

Electrolyte composition is another factor in EO performance. Previously, .OH was considered as the main contributor to organic matter removal during EO. Recent studies have pointed out that carbonate, sulfate and phosphate radicals are also potent oxidants. Compared with these anions, chloride (Cl—) in wastewater can be more readily oxidized to reactive chlorine species. Enhanced electrochemical oxidation of organic compounds observed in the presence of Cl— has been attributed to reaction with free chlorine ($Cl_2$, HOCl and $OCl^-$). More recent studies have suggested that Cl. and $Cl_2.^-$ might be primarily responsible for organic compound degradation. Thus, an anode that promotes efficient generation of chlorine radicals may be desirable.

Applications of electrochemical wastewater treatment can be hindered by several challenges, which may include: 1) relatively high energy consumption costs per kilogram of chemical oxygen demand (COD) treated in units of kWh/kg of COD, depending on the composition of the electrodes; and 2) the relatively high cost of semiconductor electrodes due to the use of platinum group metals as the primary ohmic contact materials for transfer of electrons to the base metal.

Considering each of these challenges more specifically, the energy consumption of EO wastewater treatment processes (50-1000 kWh/kg COD) may be higher than aerobic biological treatment (3 kWh/kg COD; assuming 320 $g/m^3$ of inlet COD, 50% of removal efficiency, and 0.45 $kWh/m^3$ of energy consumption per volume). Electrolysis of chloride-containing wastewater produces chlorination byproducts such as chlorate ($ClO_3^-$) and perchlorate ($ClO_4^-$). Anodes operating at higher oxidative levels are often able to eliminate organic compound byproducts at longer reaction times, however with the tradeoff of higher yields of $ClO_3^-$ and $ClO_4^-$. Currently available electrodes are relatively expensive due to the need to provide a low Schottky-barrier semiconductor in direct contact with the base-metal support of the electrode. For active electrodes, $IrO_2$ or $RuO_2$ are employed as ohmic contacts, and for nominally inactive electrodes, boron-doped diamond electrodes (BDD) are employed.

Titanium dioxide ($TiO_2$) has been recognized as a stable and reusable photocatalyst for water splitting and water treatment applications. However, it is an inefficient anode material in the absence of photoactivation due to its low electron conductivity. To overcome this limitation, conductive $TiO_2$ nanotube array electrodes have been developed that may be used in "dark" applications that do not rely on photoactivation. Even though $TiO_2$ nanotube arrays are effective for electrochemical oxidation initially, premature failure by deactivation is often observed within a few hours.

To address the foregoing limitations, an electrolysis electrode featuring a metal-doped nanotube array (NTA) is disclosed. The NTA electrode may include a cobalt-doped black-$TiO_2$ nanotube array (Co-black NTA). The metal dopants may be immobilized on the surface of the black NTA to improve water oxidation activity and reduce or prevent surface passivation. The disclosed metal-doped NTA electrode can be applied in water splitting and/or EO wastewater treatment systems, as described herein.

FIG. 1 is a schematic illustration of a first exemplary water electrolysis system 8 that includes a vessel 10 for holding an aqueous medium 18 such as water, a first electrode (electrode 1) 14 and second electrode (electrode 2)

16 for use in electrolysis, and a voltage source 38 for providing current to the electrodes 14, 16. For the purposes of simplification, only a pair of electrodes 14, 16 are illustrated, although additional electrodes can be employed.

In the system 8, the first electrode 14 includes a substrate 30 and a metal-doped nanotube array (NTA) 31 having a bottom surface contacting the substrate 30. Examples of the detailed construction of the electrode 14 are described herein with reference to the other Figures. The metal dopant added to the NTA improves the performance and service life of the electrode 14 in electrolysis applications. The second electrode 16 can be a metal base, such as a stainless steel or platinum cathode.

The vessel 10 can be any suitable container for holding the medium 18, for example, it may be a metal, plastic or glass vessel.

The system 8 can be used for splitting water into hydrogen and oxygen gas. This application may be useful for producing hydrogen gas for energy production.

Alternatively, the system 8 may be used to purify water having organic matters by making use of advanced oxidation processes (AOP) to break organic matters into small and stable molecules, such as water and $CO_2$. Wastewater may include the organic matters that are normally associated with waste products and chloride that is naturally present in urine. Accordingly, wastewater can naturally operate as electrolytic medium, or an electrolyte, such as NaCl, can optionally be added to the wastewater.

The system 8 can operate in a monopolar (MP mode) or a bipolar (BP) mode. In MP mode, the voltage source 38 provides continuous current between the electrodes 14, 16 in one direction and does not switch voltage polarity (reverse the direction of the current flow through the electrodes 14, 16). In the example shown in FIG. 1, in MP mode the first electrode 14 acts as an anode and the second electrode 16 acts as a cathode.

In BP mode, each of the electrodes 14, 16 can act as either an anode or a cathode, alternatively, depending on the polarity of the voltage source 38. Operating the system 8 in BP mode can increase the service life and improve the performance of the electrodes 14, 16.

In BP mode, the voltage source 38 can switch polarity at a set frequency so that the electrodes 14, 16 are alternatively employed as both anode and cathode. Switching the polarity of the source 38 can be accomplished by a timed switch (not shown) in the source 38 that changes the output voltage polarity of the source 38 at set times. For example, the electrodes 14, 16 can be employed as both anode and cathode with source polarity switching at an interval having a length between 10 and 30 minutes.

The nanotube array 31 can include, consist of, or consist essentially of any suitable number of nanotubes and a metal oxide that includes, consist of, or consist essentially of oxygen and one or more elements, e.g., titanium. For example, the NTA may be a black $TiO_2$ nanotube array (BNTA). In accordance with an exemplary embodiment of the electrode 14, the metal-doped NTA 31 may include a cobalt-doped black $TiO_2$ nanotube array (Co-black NTA) and the substrate 30 may be a valve metal, such as titanium, for example, Ti foil or mesh.

During operation of the water purification system 8, the source 38 applies an anodic potential 38 between the first electrode 14 and the second electrode 16 at a level that is sufficient to generate reactive species at the electrode 14, while performing as an anode.

The electrode 14 has a relatively high rate of Reactive Chlorine Species (RCS) generation and/or oxygen evolution reaction (OER). This makes the electrode 14 highly suitable for use in wastewater electrolysis systems and/or water splitting systems.

Figure 2:
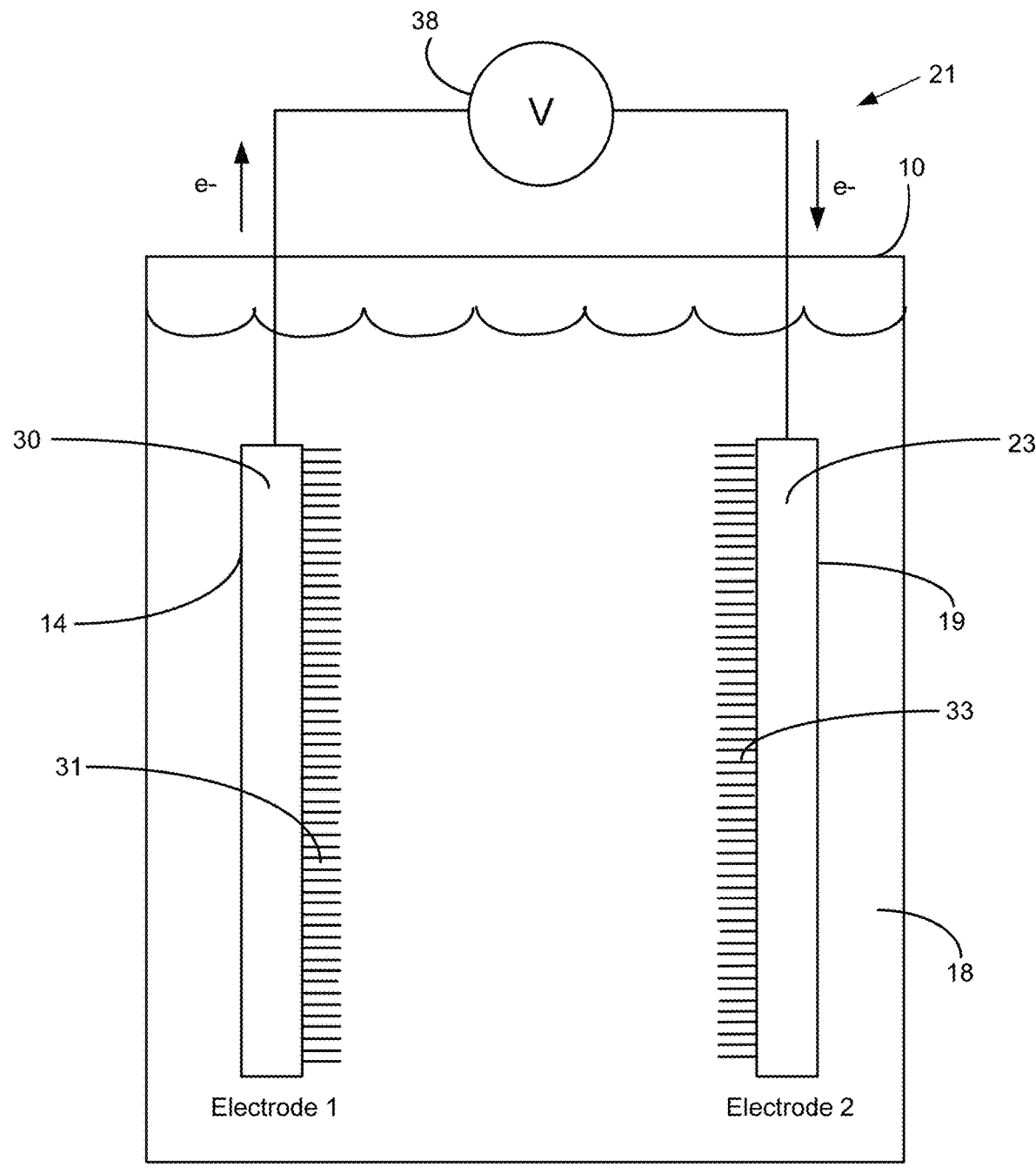
FIG. 2 is a cross-sectional side-view schematic illustration of a second exemplary electrolysis system employing two or more of the electrodes.

FIG. 2 is a schematic illustration of a second exemplary water electrolysis system 21 that includes the vessel 10 for holding the aqueous medium 18 such as water, the first electrode (electrode 1) 14 and second electrode (electrode 2) 19 for use in electrolysis, and the voltage source 38 for providing current to the electrodes 14, 19. For the purposes of simplification, only a pair of electrodes 14, 19 are illustrated, although additional electrodes can be employed.

The system 21 may be used for either water splitting or water purification, as discussed above in connection with FIG. 1. Additionally, the system 21, like the system 8 shown in FIG. 1, may be configured as either a BP mode system or MP mode system, depending on the application. The predominate difference between the systems 8 and 21 is that the second system 21 includes a metal-doped NTA electrode 19 as the second electrode. The second electrode 19 includes a substrate 23 and a metal-doped nanotube array (NTA) 33 contacting the substrate 23, which may be the same as or similar to the NTA 31 of the first electrode 14. In accordance with an exemplary embodiment of the electrode 19, the metal-doped NTA 33 may include a cobalt-doped black $TiO_2$ nanotube array (Co-black NTA) and the substrate 23 may be a valve metal, such as titanium, for example a Ti foil or mesh.

In BP mode, each of the electrodes 14, 19 can act as either an anode or a cathode, alternatively, depending on the polarity of the voltage source 38. Operating the system 21 in BP mode can increase the service life and improve the performance of the electrodes 14, 19. In BP mode, the system 21 also has at least one metal-doped NTA electrode 14, 19 in an anodic state at all time while the voltage potential is applied, increasing the reaction rate of the system 21.

Figure 3:
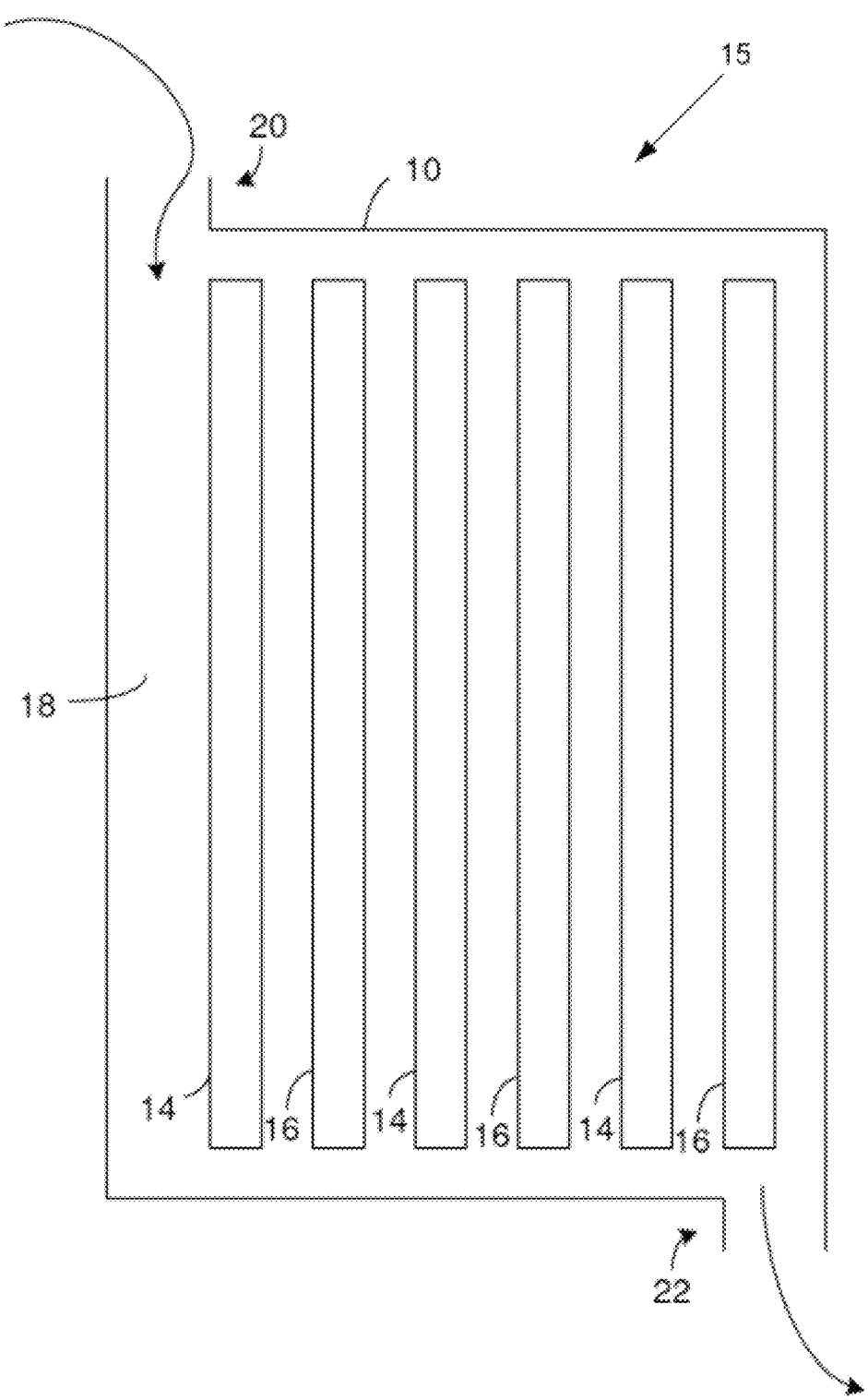
FIG. 3 illustrates a third exemplary electrolysis system such as a continuous water treatment system.

FIG. 3 illustrates an example of another suitable electrolysis system 15, such as a water purification system, or alternatively, a water splitting system, that includes multiple first electrodes 14 and second electrodes 16. The system 15 includes a vessel 10 having a reservoir. First electrodes 14 and second electrodes 16 are positioned in the reservoir such that first electrodes 14 and second electrodes 16 alternate with one another. The first electrodes 14 and second electrodes 16 are parallel or substantially parallel with one another. An aqueous medium 18 is positioned in the reservoir such that first electrodes 14 and the second electrodes 16 are in contact with the medium 18.

In some embodiments, the medium 18 may include one or more electrolytes and can be a liquid, a solution, a suspension, or a mixture of liquids and solids. In one example, the medium 18 is wastewater that includes organic matters, ammonia, and chloride ($Cl^-$). The chloride can be present in the medium 18 as a result of adding a salt to the medium 18 or the medium 18 can include urine that is a natural source of the chloride. The electrolysis system 15 also includes a voltage source (not shown) configured to drive an electrical current through the first electrodes 14 and second electrodes 16 so as to drive a chemical reaction in the medium 18. The system 15 can operate in MP mode or alternatively in BP mode.

The electrolysis system 15 illustrated in FIG. 3 includes an inlet 20 and an outlet 22. The electrolysis system 15 can operate as a continuous reactor in that the medium 18 flows into the reservoir through the inlet 20 and out of the reservoir through the outlet 22. Alternately, the electrolysis system can also be operated as a batch reactor. When the electrolysis system 15 is operated as a batch reactor, the medium 18 can be a solid, a liquid, or a combination.

In an alternative configuration of the system 15, at least some of the second electrodes 16 may include the metal-doped NTA electrode 19, instead of the metal base electrode 16.

In accordance with exemplary embodiments of the systems 8, 15, 21, the aqueous medium 18 may have a pH>7.

Any of the systems 8, 15, 21 may be employed for efficient continuous removal of one or more contaminants, which contaminants may include pharmaceuticals, biological matter, biocides such as herbicides, pesticides and fungicides, human or animal waste, pathogenic contaminants such as viruses, bacteria or parasites, chemical pollutants such as PCBs, TCEs, phthalates, or the like, semiconductor manufacturing wastewater which may contain contaminants such as perfluoroalkylsulfonate surfactants (PFAS), tetramethylammonium hydroxide (TMAH), and/or residual photopolymers, any combination of the foregoing, and the like.

Figure 4:
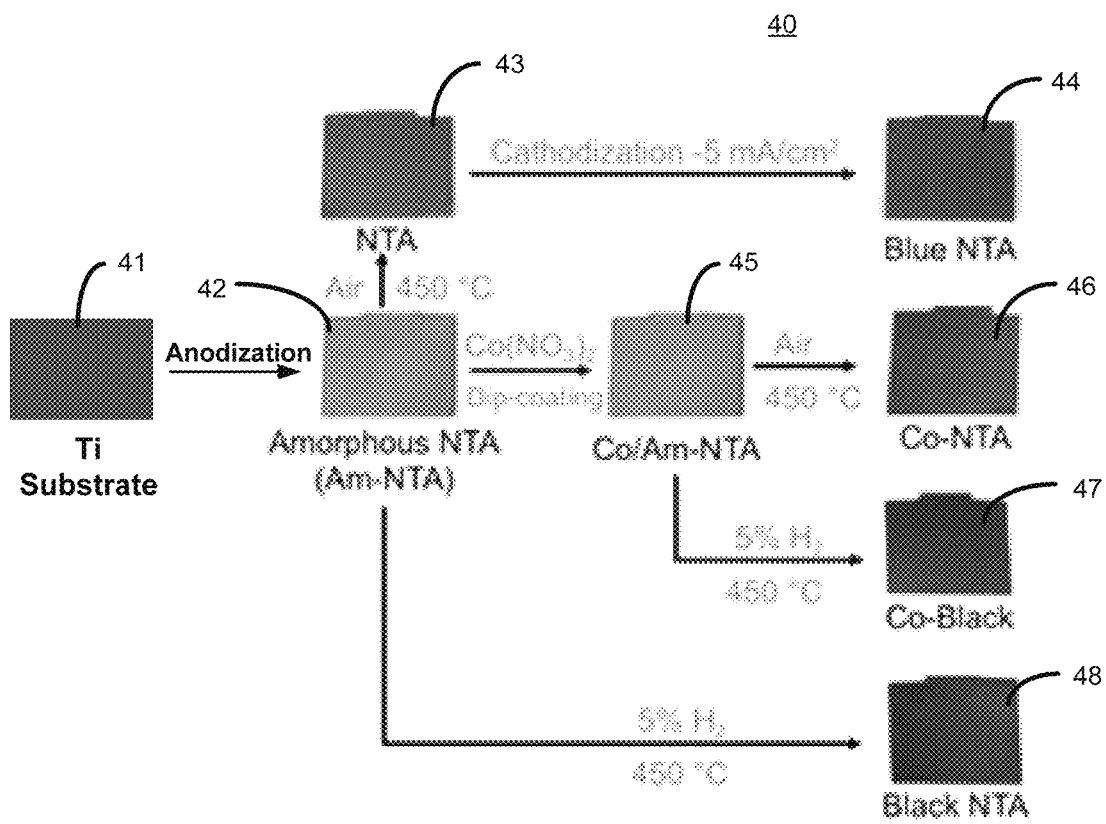
FIG. 4 is a process flow diagram illustrating methods of manufacturing one or more types of the NTA electrodes disclosed herein.

FIG. 4 is a process flow diagram 40 illustrating example methods of manufacturing one or more types of the NTA electrodes disclosed herein, which may be used in any of the systems shown in FIGS. 1-3.

First, a titanium substrate (e.g., Ti foil, plate, mesh or the like) is provided (box 41). For example, the Ti substrate may be a Ti plate or Ti mesh. Next, as shown by box 42, an amorphous $TiO_2$ NTA (Am-NTA) electrode may be prepared by a first anodization of the Ti substrate at 42 Volts in ethylene glycol (EG) electrolyte with 0.25 wt % $NH_4F$ and 2 wt % $H_2O$ for 3 to 6 hours. After the first anodization, the Am-NTA formed on the substrate is subjected to second anodization in 5 wt % $H_3PO_4$/EG electrolyte at 42 Volts for one hour to enhance its mechanical stability.

A metal loaded Am-NTA (M/Am-NTA) electrode may be prepared by dipping an Am-NTA electrode into a coating solution one or more times (box 45). For example, the Am-NTA electrode may be dipped in a coating solution for about one minute, pulled up at a rate of 10 mm/minute, and then dried at room temperature for about two minutes. The foregoing dipping procedure may be repeated two or more times to vary the loading. For example, the dipping procedure may be repeated three times. Other procedures may be used to metal load the Am-NTA, such as atomic layer deposition and/or electrodeposition. Any suitable metal may be used for loading and doping the Am-NTA electrode, for example, cobalt, iron, nickel, manganese, cerium, vanadium, lead, tin, any of the noble metals, such as Pt, Ir, Au or Ag, any combination of the foregoing, or the like.

The coating solution may be prepared by dissolving a metal nitrate salt in ethanol. Example metal nitrate salts may include $Co(NO_3)_2$, $Fe(NO_3)_3$, $Ni(NO_3)_2$, $Mn(NO_3)_2$, and $Ce(NO_3)_2$. The concentration of the metal coating solution may be 250 mM.

For some embodiments of the NTA electrode, a cobalt loaded Am-NTA (Co/Am-NTA) electrode may be prepared by dipping an Am-NTA electrode into 250 mM $Co(NO_3)_2$/ethanol solution. For example, the Am-NTA may be dipped into the coating solution for one minute, pulled up at the rate of 10 mm/minute, and finally dried at room temperature for two minutes. The dip-coating process may be repeated three times. This process may result in a Co loading of the NTA of about 0.54±0.12 µmol/cm², as determined by ICP-MS (Agilent 8800), forming a Co-black NTA electrode.

The amount of metal included in the metal-doped nanotube array may be tuned to a predetermined amount based on the application of the electrode. Any suitable metal loading amount may be used, such as <5 µmol/cm² of the effective area of the NTA. For example, lowering the $Co(NO_3)_2$ concentration in the dip-coating solution to 50 or 25 mM and following the above three-dip procedure produces different embodiments of the Co-black NTA electrode, with Co loadings of 0.25 and 0.17 µmol/cm₂, respectively, referred to herein as Co(0.25)-black NTA and Co(0.17)-black NTA, respectively.

A metal-doped black NTA (M-black NTA) electrode may be obtained by annealing the M/Am-NTA electrode in a stream of 5% $H_2$/Ar at 450° C. for 30 min and then naturally cooling down to room temperature.

For example, a cobalt-doped black NTA (Co-black) electrode may be obtained by annealing a Co/Am-NTA electrode in a stream of 5% $H_2$/Ar at 450° C. for 30 min and then naturally cooling it down to room temperature (box 47).

A black NTA electrode may be obtained by annealing an Am-NTA electrode in a stream of 5% $H_2$/Ar at 450° C. for 30 min and then naturally cooling it down to room temperature (box 48).

Annealing a Co/Am-NTA electrode in air at 450° C. for one hour yields a Co-NTA electrode (box 46).

Annealing an Am-NTA electrode in air at 450° C. for one hour yields an NTA electrode (box 43). A blue NTA electrode may be prepared by applying a cathodic current of 5 mA cm⁻² on the NTA electrode for ten minutes in a 0.1 M potassium phosphate buffer solution (KPi) (box 44).

The thermally-treated NTA electrodes, including the Co-black NTA, may be in the anatase phase with a preferential exposure of (101) planes.

Figure 5:
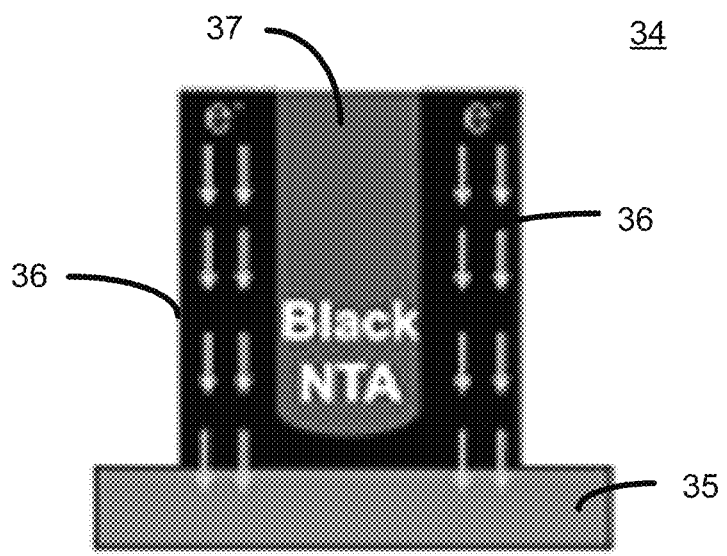
FIG. 5 is a schematic conceptual cross-sectional view showing electron flow through a Co-black nanotube, which may be included in any of the NTA electrodes of FIGS. 1-3.

FIG. 5 is a schematic conceptual cross-sectional view showing electron flow through an exemplary Co-black nanotube 34, which may be included in any of the NTA electrodes 14, 19 of FIGS. 1-3. The nanotube 34 is formed of one or more walls 36 protruding from substrate 35. The tube walls 26 form a hollow interior section 37. The walls 36 can be Co-black $TiO_2$ formed on the substrate 35, as disclosed herein. The substrate 35 may be a valve metal, such as Ti.

As shown in FIG. 5, during anodic operation, electron flow proceeds from the aqueous medium down the Co-black $TiO_2$ walls 36 of each nanotube 34 of an array into the substrate 35. Bulk oxygen vacancies ($O_v$) are the primary source of the enhanced conductivity of Co-black NTA.

Conductive NTAs supported on titanium plates, consisting of a multitude of nanotubes, such as nanotube 34, have an advantage over particulate electrocatalysts, since they can be utilized directly as electrodes without the need for additional adhesive substrates or organic binders. However, deactivation of both blue and black NTAs have been observed after a few hours of electrocatalysis due to the surface passivation.

To overcome this problem, doping trace amounts of a metal, such as cobalt, onto a black $TiO_2$ NTA (Co-black NTA) dramatically increases electrode stability. It also provides further advantage by lowering of the OER overpotential. Generally, in Co-black NTAs $CoO_x$ is immobilized and stable on the black NTAs even at circum-neutral pH. Cobalt doping of black $TiO_2$ NTA significantly extends the lifetime of black NTA electrodes via tuning of the concentration and stability of surficial oxygen vacancies. Cobalt doping of black $TiO_2$ NTA may both create and stabilize surficial $O_v$, preventing surface passivation.

Enhanced stability was observed for the disclosed Co-black NTA electrode. Under comparative testing, the Co-black NTA electrode had an operational life of over 200 hours. Previously reported operational lifetimes of some conductive NTA electrodes were less than three hours.

Testing also demonstrated that the disclosed Co-black NTA electrodes have higher OER activity due to their lower onset potentials and higher current densities than known anodes. Co-black NTA electrodes with Co loading of about 0.54 µmol/cm$^2$ exhibit 200 times higher current density compared with Co—TiO$_2$ film electrodes at 2.3 V$_{RHE}$. This finding shows the improvement provided by a conductive NTA substrate over the OER activity of a Co—TiO$_2$ electrode.

The improvement in OER provided by the Co-black NTA electrode is a result of the cobalt doping. Catalytic activity, such as OER, is determined by the number of active sites. Surficial O$_v$ is generally considered as an active site for OER. It exposes unsaturated metal ions, which in turn, lead to the adsorption and dissociation of H$_2$O. Cobalt doping of the black NTA reduces the level of surficial Ti$^{4+}$ in Co-black NTA to a lower valence state, and thus, creates more surficial O$_v$ (about 25% more).

Further testing demonstrated that certain disclosed Co-black NTA electrodes outperformed IrO$_2$-based dimensionally stable anode (DSA) for oxidative electrochemical wastewater treatment. For example, the increase of Co loading may form a CoO$_x$ film on top of a Co-black NTA substrate. The resultant CoO$_x$/Co-black composite electrode (Co*-black NTA and Co**-black NTA electrodes, described herein below) exhibit high OER activity (e.g., overpotential of 352 mV vs. 434 mV for IrO$_2$ DSA) and stability (>200 operational hours) in 1 M KOH electrolyte at 10 mA/cm$^2$.

Figure 6:
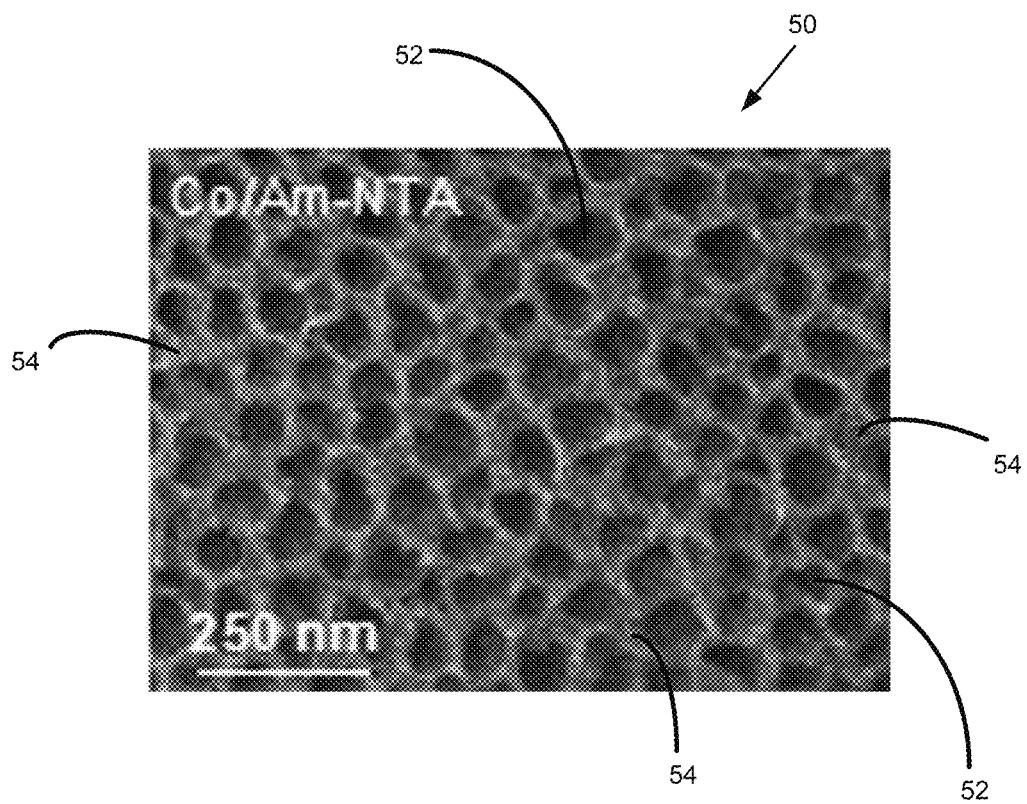
FIG. 6 is a scanning electron microscope (SEM) image of the top surface of an exemplary co-amorphous NTA produced from a process depicted by FIG. 4.

FIG. 6 is a scanning electron microscope (SEM) image of the top surface 50 of an exemplary Co-amorphous (Co—Am) NTA produced from a process depicted by FIG. 4. As shown, a plurality of nanotubes 52 are formed adjacent to one another with cobalt rich areas 54.

Figure 7:
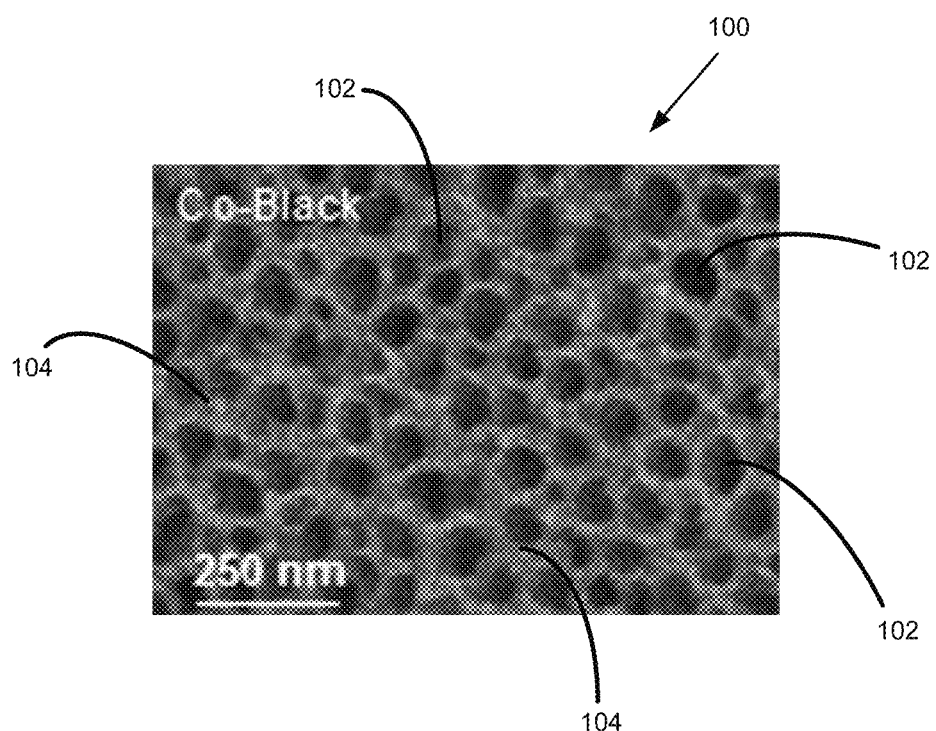
FIG. 7 is a scanning electron microscope (SEM) image of the top surface of an exemplary Co-black NTA electrode resulting from a process depicted by FIG. 4.

FIG. 7 is a scanning electron microscope (SEM) image of the top surface 100 of an exemplary Co-black NTA electrode resulting from a process depicted by FIG. 4. As shown, a plurality of nanotubes 102 are formed adjacent to one another with cobalt rich areas 104.

Figure 8:
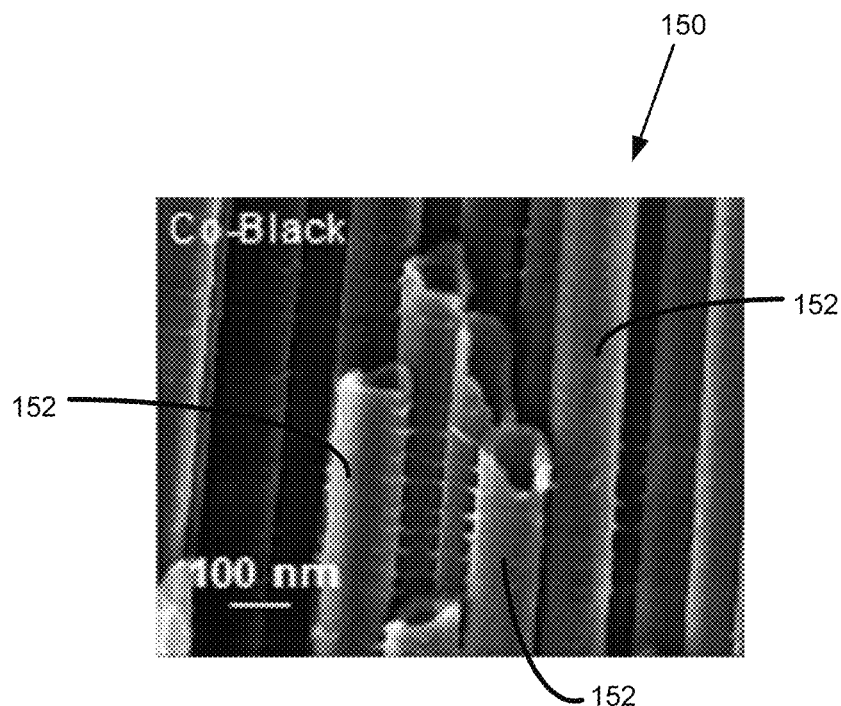
FIG. 8 is a scanning electron microscope (SEM) perspective image of an exemplary Co-black NTA resulting from a process depicted by FIG. 4 and includable in the Co-black NTA electrodes disclosed herein.

FIG. 8 is a scanning electron microscope (SEM) perspective image of an exemplary Co-black NTA 150 resulting from a process depicted by FIG. 4 and includable in the Co-black NTA electrodes disclosed herein. The Co-black NTA 150 includes a multitude of nanotubes 152, each having a tubular wall and hollow center.

Figure 9A:
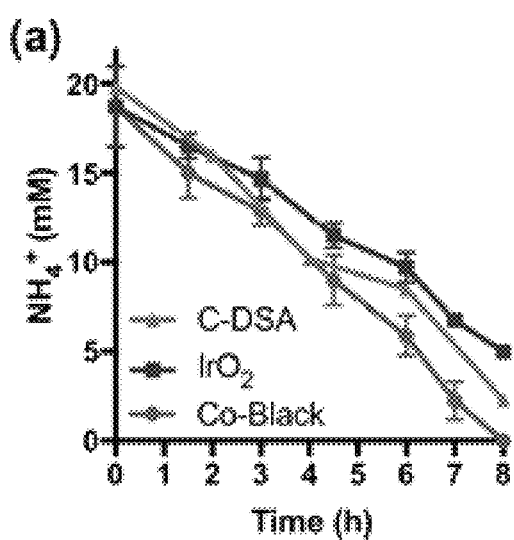
FIGS. 9A-B are graphs comparing experimental results of wastewater treatment using a disclosed Co-black NTA electrode and prior electrodes.
Figure 9B:
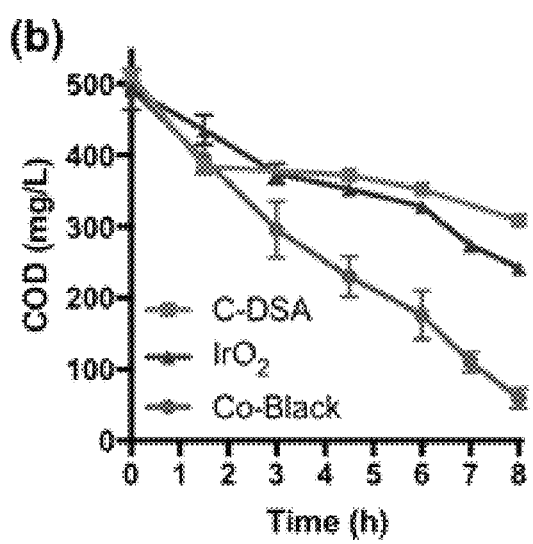

FIGS. 9A-B are graphs comparing experimental results of wastewater treatment using a disclosed Co-black NTA electrode and prior electrodes. The graphs compare the performance of a commercially-available IrO$_2$ dimensionally stable anode (C-DSA), a laboratory-made IrO$_2$ dimensional stable anode (DSA), and a disclosed Co-black NTA anode. FIG. 9A shows the decay of NH$_4^+$ as a function of electrolysis time, and FIG. 9B shows the decay of chemical oxygen demand (COD) as a function of electrolysis time.

Figure 10A:
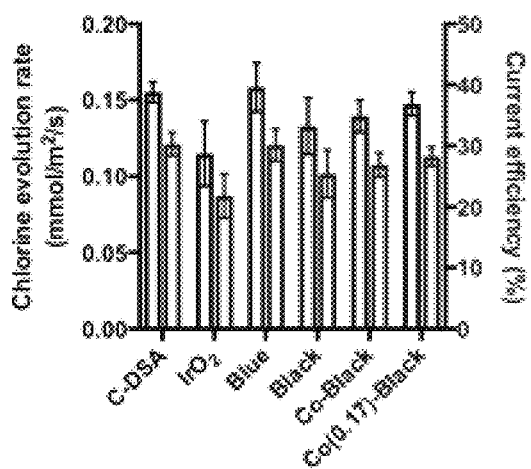
FIGS. 10A-C are graphs of example experimental results comparing certain radical species generation during electrolysis using disclosed Co-black NTA electrodes and prior electrodes.

To obtain these experimental results, a Co-black NTA anode was applied for the treatment of latrine wastewater that was collected on the Caltech campus in a prototype solar toilet system. Chloride (40 mM) that originated from human waste (i.e., urine) is oxidized to chlorine (e.g., HOCl, ClO$^-$). Hypochlorus acid, HOCl, reacts with ammonia (NH$_3$/NH$_4^+$) to form chloramines (e.g., NH$_2$Cl, NHCl$_2$), which in turn undergo a self-reaction leading to denitrification with the off-gassing of N$_2$ leading eventually to breakpoint chlorination. The Co-black anode outperformed the IrO$_2$ DSA due to its higher CER activity (FIG. 10A). Although the C-DSA had higher CER, it exhibited inferior NH$_4^+$ removal performance than Co-black NTA anode. This may be because the Co-black NTA anode is more active for the removal of organics, which compete with NH$_4^+$ to react with chlorine. Both chlorine and .OH contribute to the removal of organic pollutants (indexed in terms of chemical oxygen demand, COD). As shown, the COD removal capability of the Co-black anode is superior to that of IrO$_2$ DSA and C-DSA (FIG. 9B). The effluent after eight hours of treatment was clear in appearance and suitable for non-potable water reuse.

Figure 10B:
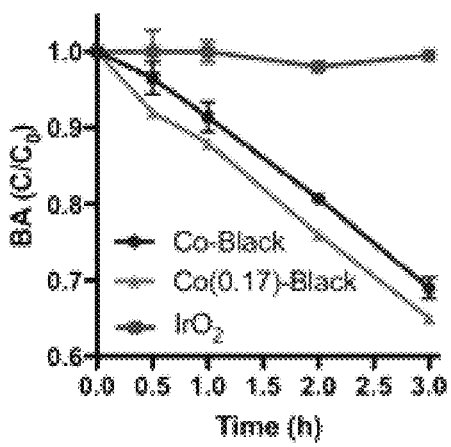
Figure 10C:
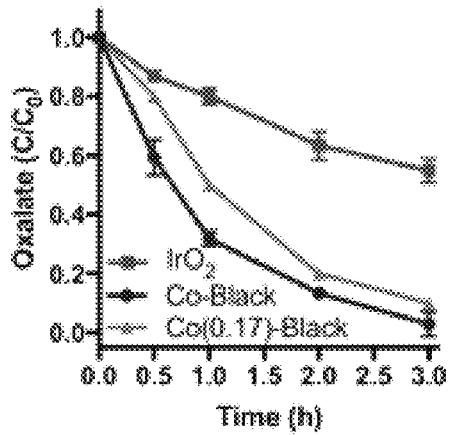

FIGS. 10A-C are graphs of example experimental results comparing certain radical species generation during electrolysis using disclosed Co-black NTA anodes and prior anodes. FIG. 10A shows a comparison of the chlorine evolution rate in 30 mM NaCl of certain anodes. FIG. 10A shows a comparison of hydroxyl radical production measured by electrochemical oxidation of benzoic acid for a Co-black NTA anode, a Co(0.17)-black NTA anode, and an IrO$_2$ anode. FIG. 10c shows a comparison of the direct oxidation efficiency measured by electrochemical oxidation of oxalate ion for a Co-black NTA anode, a Co(0.17)-black NTA anode, and an IrO$_2$ anode. A constant current of 10 mA cm$^{-2}$ was applied to each of the anodes in each of the above tests.

Regarding FIG. 10B, hydroxyl radical can be generated during water electrolysis. Benzoic acid (BA) was selected as a radical probe compound (r$_{.OH}$=5.90×10$^9$ M$^{-1}$ s$^{-1}$). Faster degradation kinetics observed for the Co-black NTA anode compared to IrO$_2$ anode indicates the Co-black anode has a higher activity toward .OH generation than the IrO$_2$ anode. The direct electron transfer (DET) mechanism may also contribute to the oxidation of organic compounds. Regarding FIG. 10C, the oxalate ion was selected to investigate the DET activity, as it is known to be reactive via DET due to surface complex formation, but at the same time, oxalate reacts slowly with .OH (r$_{.OH}$=1.4×10$^6$ M$^{-1}$ s$^{-1}$) compared to typical hydroxyl radical second-order rate constants. FIG. 10C indicates that the Co-black anode shows higher DET activity than the corresponding IrO$_2$ electrode. As shown in the graphs of FIGS. 10A-C, the Co(0.17)-Black NTA electrode shows comparable activity with Co-black NTA electrode with regard to chlorine evolution, radical production, and DET reaction.

Additional embodiments of the disclosed electrodes include a Co*-black NTA electrode and a Co**-black NTA electrode. These electrodes have higher OER activity compared to the Co-black NTA electrode.

The Co*-black NTA and Co**-black NTA electrodes can each be made by increasing the Co loading of a Co-black NTA electrode to form a CoO$_x$ film on top of the NTA. To make a Co*-black NTA electrode, a Co(NO$_3$)$_2$/ethanol solution may be drop-cast onto a Co-black NTA electrode. The electrode is then reduced in 5% H$_2$/Ar at 450° C. for 30 minutes. During annealing, a discrete film layer of amorphous CoO$_x$ is formed on top of the Co-black NTA. The CoO$_x$ film may have a higher valence (3+/2+) than that of Co-black NTA (2+) due to the absence of Co—TiO$_2$ interaction. The Co*-Black composite NTA electrode with Co loading of 2.1 µmol cm$^{-2}$ may have an OER overpotential of 360 and 434 mV, respectively, at 1.0 and 10 mA cm$^{-2}$ constant current in 1 M KOH.

The Co**-black NTA electrode is made following the same steps as making the Co*-black NTA electrode, but increasing the Co loading to 4.2 µmol cm$^{-2}$. The Co-black NTA electrode may have greater OER activity; this electrode may have an overpotential of 289 and 352 mV at 1.0 and 10 mA cm$^{-2}$ constant current, respectively, in 1 M KOH. The performance of the Co-Black NTA electrode is not only higher than IrO$_2$ DSA, C-DSA, and Co(OH)$_x$/Ti, but also superior to the reported activities of a benchmarking Co(OH)$_x$/GC (400 mV at 10 mA cm$^{-2}$), Co$_3$O$_4$ nanowires (320 mV at 1 mA cm$^{-2}$), Co$_3$O$_4$ nanosheets (390 mV at 10 mA cm$^{-2}$), and Co@Co$_3$O$_4$ nanoparticles (420 mV at 10 mA cm$^{-2}$).

A higher OER activity may be achieved by doping Ni and Fe into the CoO$_x$ film of the Co*-black NTA and Co**-black NTA electrodes.

The higher OER activity of Co**-black NTA electrode may be attributed to two primary factors. First, more OER active sites are created by the CoO$_x$ film. A double-layer capacitance may be formed, which is proportional to the electrochemically active surface area (ECSA), increases in the order of Co-black (7.5)<Co*-black (12.4)<Co-black (21.4 mF cm$^{-2}$). A Co-black NTA electrode with 6 cm$^2$ geometric area has a large ECSA of 3210 cm$^2$, giving a roughness factor of 535. Co-black NTA has higher O$_v$ concentration (32%) than Co-black NTA (25%). The oxygen vacancies of CoO$_x$ are surrounded by Co ions (Co—O$_v$—Co), which may be intrinsically more OER active than the Co—O$_v$—Ti and Ti—O$_v$—Ti sites of Co-black NTA. Secondly, the anti-passivation functionality of Co-black facilitates charge transport from the CoO$_x$ film to Co-black NTA, then to the underneath Ti metal support. A Co-black NTA electrode was tested to be stable for more than 200 hours in 1.0 M KOH at 10 mA cm$^{-2}$. In both the Co*-black NTA and Co**-black NTA electrodes, the presence of Co-black NTA as an interlayer may prevent the passivation of the catalyst/Ti interface, thus dramatically improving the stability of the electrodes.

The disclosed electrodes may be employed in solar powered toilets and waste treatment systems, for example, those disclosed in U.S. Published Patent Application 2014/0209479, which is incorporated by reference herein in its entirety. For example, the source 38 of FIG. 1 herein may be a photovoltaic source. And the electrolysis can be done on human waste, such as the electrolysis of urine depicted in FIG. 17C of U.S. Published Patent Application 2014/0209479.

The foregoing description is illustrative and not restrictive. Although certain exemplary embodiments have been described, other embodiments, combinations and modifications involving the invention will occur readily to those of ordinary skill in the art in view of the foregoing teachings. Therefore, this invention is to be limited only by the following claims, which cover at least some of the disclosed embodiments, as well as all other such embodiments and modifications when viewed in conjunction with the above specification and accompanying drawings.

What is claimed is:

1. An electrolysis electrode, comprising:
   a substrate; and
   cobalt-doped black TiO$_2$ nanotube array contacting the substrate.

2. The electrode of claim 1, further comprising a metal oxide film on top of the nanotube array.

3. The electrode of claim 1, wherein the cobalt included in the cobalt-doped black TiO$_2$ nanotube array has a loading of less than 5 μmol/cm$^2$.

4. The electrode of claim 3, wherein the cobalt included in the cobalt-doped black TiO$_2$ nanotube array has a loading between about 0.17 μmol/cm$^2$ and 0.54 μmol/cm$^2$.

5. The electrode of claim 1, wherein the amount of cobalt included in the cobalt-doped black TiO$_2$ nanotube array is tuned to a predetermined amount based on the application of the electrode.

6. The electrode of claim 1, wherein the substrate includes titanium.

7. A water processing system, comprising:
   the electrode of claim 1, configured to be, at least in part, in direct contact with water.

8. The system of claim 7, further comprising a second electrode.

9. The system of claim 8, wherein the second electrode includes a second substrate, and a metal-doped nanotube array contacting the second substrate.

10. The system of claim 7, further comprising:
    a voltage source connected to the electrode and a second electrode configured to contact the water;
    wherein the voltage source is configured to switch polarity at a predetermined frequency so that the electrode operates as either an anode or a cathode based on the polarity of the voltage source.

11. The system of claim 7, wherein the substrate includes titanium.

* * * * *